(12) United States Patent
Lee et al.

(10) Patent No.: US 8,867,238 B2
(45) Date of Patent: Oct. 21, 2014

(54) DC/DC CONVERTER, AND ELECTRIC GENERATING SYSTEM USING SOLAR CELL HAVING THE SAME

(75) Inventors: Tae Won Lee, Gyeonggi-do (KR); Kwang Soo Choi, Seoul (KR); Min Ho Heo, Gyeonggi-do (KR); Jeong Kyu Park, Gyeonggi-do (KR); Chung Yuen Won, Gyeonggi-do (KR); Yong Hyok Ji, Gyeonggi-do (KR); Young Ho Kim, Seoul (KR); Tae Hoon Kim, Gyeonggi-do (KR)

(73) Assignees: Samsung Electro-Mechanics Co., Ltd., Gyunggi-Do (KR); Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 155 days.

(21) Appl. No.: 13/462,755

(22) Filed: May 2, 2012

(65) Prior Publication Data

US 2013/0003425 A1 Jan. 3, 2013

(30) Foreign Application Priority Data

Jun. 28, 2011 (KR) ........................ 10-2011-0062939

(51) Int. Cl.
*H02M 3/335* (2006.01)
*H02M 7/48* (2006.01)
*H02J 3/38* (2006.01)

(52) U.S. Cl.
CPC ............ *H02M 7/4807* (2013.01); *Y02E 10/563* (2013.01); *Y02E 10/58* (2013.01); *H02J 3/383* (2013.01)
USPC ..................................... 363/21.14; 363/21.06

(58) Field of Classification Search
USPC ................... 363/21.12–21.14, 21, 20, 21.01, 363/21.04–21.06, 84, 89, 95, 97, 98, 131, 363/132, 127, 37; 323/268, 222, 282–287, 323/271–275, 351, 906; 307/45, 82
See application file for complete search history.

(56) References Cited

U.S. PATENT DOCUMENTS 6,809,942 B2 * 10/2004 Madenokouji et al. ......... 363/98
2009/0316441 A1 * 12/2009 Hu .............................. 363/21.06

FOREIGN PATENT DOCUMENTS

| JP | 11-298028 | 10/1999 |
|---|---|---|
| JP | 2008-140038 A | 6/2008 |
| KR | 10-2009-0125321 A | 12/2009 |

* cited by examiner

*Primary Examiner* — Timothy J Dole
*Assistant Examiner* — Carlos Rivera-Perez
(74) *Attorney, Agent, or Firm* — Bracewell & Giuliani LLP; Brad Y. Chin (57) ABSTRACT

Disclosed herein is an electric generating system using a solar cell which converts a voltage generated in the solar cell into an Alternating Current (AC) voltage, and applies the converted voltage to a power system. The electric generating system includes; a Direct Current (DC)/DC converter that converts the voltage generated in the solar cell into a DC voltage, and has a synchronous rectifier including a synchronous switch; and a controller that detects one of a phase and a voltage of the power system, and selectively connects the synchronous switch of the synchronous rectifier in accordance with one of the phase and voltage of the power system. Here, the electric generating system reduces a conduction loss, and increases overall efficiency of the electric generation system.

14 Claims, 4 Drawing Sheets

DC/DC CONVERTER, AND ELECTRIC GENERATING SYSTEM USING SOLAR CELL HAVING THE SAME

CROSS REFERENCE (S) TO RELATED APPLICATIONS

This application claims the benefit under 35 U.S.C. Section 119 of Korean Patent Application Serial No. 10-2011-0062939, entitled "DC/DC Converter, and Electric Generating System Using Solar Cell Having The Same" filed on Jun. 28, 2011, which is hereby incorporated by reference in its entirety into this application.

BACKGROUND OF THE INVENTION

1. Technical Field

The present invention relates to a Direct Current (DC)/DC converter and an electric generating system using a solar cell having the same, and more particularly, a DC/DC converter and an electric generating system using a solar cell having the same, which may generate electricity using sunlight.

2. Description of the Related Art

Recently, due to a significant increase in demands for electric power, expansion of an electric power infrastructure has emerged as an important issue. In a case of when electric power is in high demand, insufficient standby power is caused by a significant increase in a power load in response to a specific season and a specific time zone, resulting in electrical occurrences such as a blackout.

In order to prevent an occurrence as described above, a variety of attempts have been made, such as expanding the electric power infrastructure, limiting the use of electric power, and the like. As one of the attempts, a method of using a solar cell, which is considered an infinitely clean energy source, and has advantages coinciding with the domestic semiconductor technologies has received attention.

As for an electric generating system using the solar cell, a power conversion apparatus is mounted in a rear surface of each of a plurality of solar cell modules, and the power conversion apparatus includes a Direct Current (DC)/DC convertor, a DC/Alternating Current (AC) converter, and a controller for controlling operations of these converters.

Among others, the DC/DC converter has a transformer to convert a DC voltage generated in the solar cell into a pulsed DC, and connects an output diode to a secondary coil of the transformer to prevent current from flowing in a reverse direction.

In this manner, when the output diode is connected to the secondary coil of the transformer, it is possible to convert into a DC voltage having a desired level, and to prevent malfunction of the power conversion apparatus due to an applied excessive current.

However, in a scheme in which the output diode is connected to the DC/DC converter in the related art, a conduction loss is increased due to a forward voltage drop and an internal resistance that occur at both ends of the output diode, resulting in degradation in the overall efficiency of the electric generating system using the solar cell.

SUMMARY OF THE INVENTION

An object of the present invention is to provide a Direct Current (DC)/DC converter that may connect a synchronous rectifier including a synchronous switch and a synchronous diode to a transformer, reduce a conduction loss by selectively operating the synchronous switch or the synchronous diode in accordance with a phase or voltage of a power system, and increase overall efficiency of an electric generating system using a solar cell, and provides the electric generating system using the solar cell including the DC/DC converter.

According to an exemplary embodiment of the present invention, there is provided an electric generating system using the solar cell that converts a voltage generated in a solar cell into an alternating current (AC) voltage, and applies the converted voltage to a power system, the electric generating system including: a direct current (DC)/DC converter that converts the voltage generated in the solar cell into a DC voltage, and includes a synchronous rectifier having a synchronous switch; and a controller that detects one of a phase and a voltage of the power system, and selectively connects the synchronous switch of the synchronous rectifier in accordance with one of the phase and the voltage of the power system.

Here, the synchronous rectifier may further include a synchronous diode that is connected in parallel with the synchronous switch.

Also, when one of the phase and the voltage of the power system is included in a predetermined reference interval, the controller may connect the synchronous switch.

Also, when one of the phase and the voltage of the power system is not included in the predetermined reference interval, the controller may conduct the synchronous diode.

In this instance, the reference interval may be an interval in which a loss when the synchronous switch corresponding to one of the phase and the voltage of the power system is connected is smaller than a loss when the synchronous diode is conducted.

Also, the controller may calculate a loss when the synchronous switch corresponding to one of the phase and the voltage of the power system is connected and a loss when the synchronous diode is conducted, and connects the synchronous switch in a case in which the loss when the synchronous switch is connected is smaller than the loss when the synchronous diode is conducted.

Also, the controller may calculate a loss when the synchronous switch corresponding to one of the phase and the voltage of the power system is connected and a loss when the synchronous diode is conducted, and conduct the synchronous diode in a case in which the loss when the synchronous switch is connected is larger than the loss when the synchronous diode is conducted.

Meanwhile, the controller may include a time detection unit that detects a conduction time of the synchronous rectifier, the conduction time being a time during which a current is conducted through the synchronous rectifier, and a synchronous rectifier signal generation unit that outputs a synchronous rectifier synchronous switch control signal to selectively connect the synchronous switch during the conduction time of the synchronous rectifier.

In this instance, the synchronous rectifier signal generation unit may include a first calculator that calculates a loss when the synchronous switch is connected, a second calculator that calculates a loss when the synchronous diode is conducted, and an operation controller that compares a loss when the synchronous switch corresponding to one of the phase and voltage of the power system is connected and a loss when the synchronous diode is conducted during the conduction time of the synchronous rectifier, and outputs a synchronous rectifier synchronous switch control signal for controlling an operation of the synchronous switch based on a compared result.

Here, the first calculator may calculate the loss when the synchronous switch is connected, using a maximum current value of the synchronous switch and an RMS current value of the synchronous switch. Also, the first calculator may calculate the maximum current value of the synchronous switch using the following Equation 1.

$$i_{s,peak} = \frac{V_{Lm}}{n \cdot L_m} D_{sp,turn-on}.$$ [Equation 1]

Here, Lm denotes an inductance of a magnetization inductor, $V_{LM}$ denotes a voltage applied to the magnetization inductor, n denotes a winding ratio of a transformer, and $D_{sp}$, turn-on denotes a duty ratio of a converter switching element.

Also, the first calculator may calculate the RMS current value of the synchronous switch using the following Equation 2.

$$i_{s,rms} = i_{s,peak} \cdot \sqrt{\frac{D_{s,turn-on} + \frac{t_{ri}}{T_{sp}}}{3}}.$$ [Equation 2]

Here, $T_{sp}$ denotes a period of the converter switching element, $t_{ri}$ denotes a time during which a current rises at the time of a turn-on operation of the synchronous switch and Ds, turn-on denotes a duty ratio of a synchronous rectifier.

In addition, the first calculator may calculate the time during which the current rises at the time of connection of the synchronous switch using the following Equation 3.

$$t_{ri} = \frac{Q_{gs}}{\frac{V_{CC} - V_{Flat}}{R_{gate}}} - \frac{Q_{g(th)}}{\frac{V_{CC} - V_{GS(th)}}{R_{gate}}}.$$ [Equation 3]

Here, $Q_{gs}$ denotes a charge between a gate and source of the synchronous switch, $Q_{gs(th)}$ denotes a charge up to a threshold voltage, $V_{cc}$ denotes a voltage applied to a gate drive of the synchronous switch, $V_{flat}$ denotes a flat voltage of the gate drive of the synchronous switch, $V_{gs(th)}$ denotes a gate threshold voltage of the synchronous switch, and $R_{gate}$ denotes a gate resistance of the synchronous switch.

In addition, the first calculator may calculate the loss when the synchronous switch is connected using the following Equation 4.

$$P_s = P_c + P_{sw} = R_{DS(on)} \cdot i_{s,rms}^2 + \frac{1}{2} v_{s,peak} \cdot i_{s,peak} \cdot (t_{ri} + t_r) f_{sp}.$$ [Equation 4]

Here, $R_{DS(on)}$ denotes an internal resistance of the synchronous switch, $f_{sp}$ denotes a switching frequency, and $t_r$ denotes a rise time.

Meanwhile, the second calculator may calculate the loss when the synchronous diode is conducted using an average current value flowing through the synchronous diode and an RMS current value of the synchronous diode.

Here, the second calculator may calculate the average current value flowing through the synchronous diode using the following Equation 5.

$$\langle i_{diode} \rangle = \frac{1}{2} \cdot i_{diode,peak} \cdot D_{diode,turn-on} + \frac{1}{2} \cdot i_{diode,peak} \cdot \frac{t_{ri}}{T_{sp}}.$$ [Equation 5]

Here, $I_{diode,peak}$ denotes a maximum current value of the synchronous diode, $D_{diode,turn-on}$ denotes a duty ratio of the synchronous diode, denotes a period of a converter switching element, and $t_{ri}$ denotes a time during which a current rises at the time of connection of the synchronous switch.

Also, the second calculator may calculate the RMS current value of the synchronous diode using the following Equation 6.

$$i_{diode,rms} = i_{diode,peak} \cdot \sqrt{\frac{D_{diode,turn-on} + \frac{t_{ri}}{T_{sp}}}{3}}.$$ [Equation 6]

Here, $I_{diode,peak}$ denotes the maximum current value of the synchronous diode, $D_{diode,turn-on}$ denotes the duty ratio of the synchronous diode, $T_{sp}$ denotes the period of the converter switching element, and $t_{ri}$ denotes the time during which the current rises at the time of connection of the synchronous switch.

Also, the second calculator may calculate the loss when the synchronous diode is conducted using the following Equation 7.

$$P_d = P_c = V_{FO} \cdot \langle i_{diode} \rangle + R_{d(on)} i_{diode,rms}^2.$$ [Equation 7]

Here, $R_{d(on)}$ denotes an internal resistance of the synchronous diode, and $V_{po}$ denotes a forward voltage drop of the synchronous diode.

According to an exemplary embodiment of the present invention, there is provided a DC/DC converter that converts a voltage generated in a solar cell into a DC voltage, including: a transformer that has a secondary coil for inducing energy from a primary coil receiving a primary current; a synchronous rectifier that includes a synchronous switch connected with the secondary coil of the transformer, and a synchronous diode connected in parallel with the synchronous switch; and a synchronous rectifier control unit that detects one of a phase and voltage of the power system, and selectively connects the synchronous switch of the synchronous rectifier in accordance with one of the phase and the voltage of the power system.

Here, when one of the phase and voltage of the power system is included in a predetermined reference interval, the synchronous rectifier control unit may connect the synchronous switch, and when one of the phase and the voltage of the power system is not included in a predetermined reference interval, the synchronous rectifier control unit may conduct the synchronous diode.

In this instance, the reference interval is an interval in which a loss when the synchronous switch corresponding to one of the phase and the voltage of the power system is connected is smaller than a loss when the synchronous diode is conducted.

Also, the synchronous rectifier control unit may calculate a loss when the synchronous switch corresponding to one of the phase and voltage of the power system is connected and a loss when the synchronous diode is conducted, and connects the synchronous switch in a case in which the loss when the synchronous switch is connected is smaller than the loss when the synchronous diode is conducted.

In addition, the synchronous rectifier control unit may calculate a loss when the synchronous switch corresponding to one of the phase and the voltage of the power system is connected and a loss when the synchronous diode is conducted, and conducts the synchronous diode in a case in which the loss when the synchronous switch is connected is larger than the loss when the synchronous diode is conducted.

DESCRIPTION OF THE PREFERRED EMBODIMENTS

Terms or words used in the specification and the appended claims should not be construed as normal and dictionary meanings and should be construed as meanings and concepts which conform with the spirit of the present invention according to a principle that the inventor can properly define the concepts of the terms in order to describe his/her own invention in the best way.

Accordingly, embodiments disclosed in the specification and configurations shown in the accompanying drawings are just the most preferred embodiment, but are not limited to the spirit and scope of the present invention. Therefore, at this application time, it will be appreciated that various equivalents and modifications may be included within the spirit and scope of the present invention.

Hereinafter, exemplary embodiments of the present invention will be described in detail with reference to the accompanying drawings.

Figure 1:
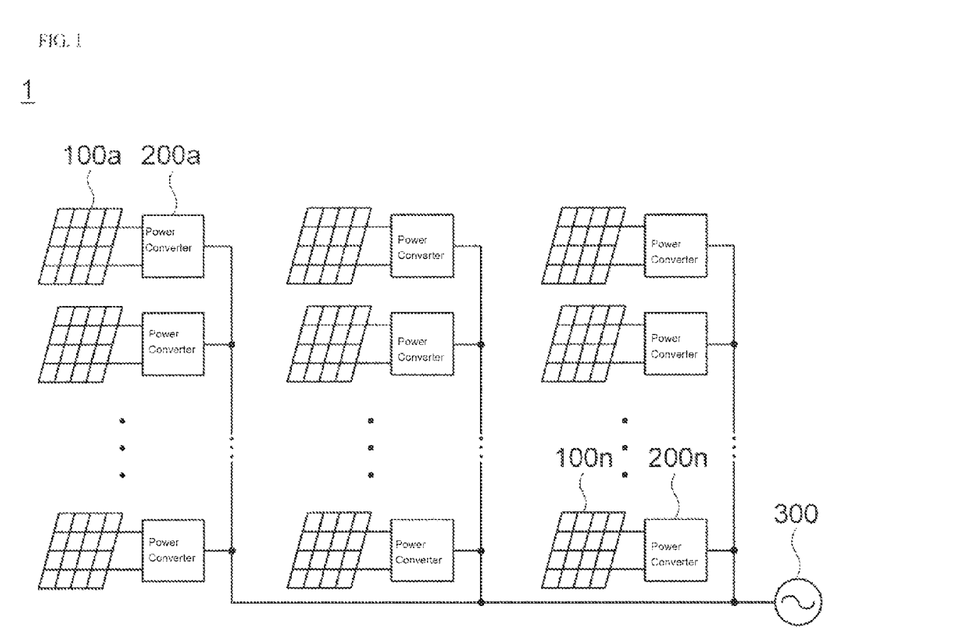
FIG. 1 is an overall configuration diagram of an electric generating system using a solar cell according to an exemplary embodiment of the present invention.

FIG. 1 is an overall configuration diagram of an electric generating system using a solar cell according to an exemplary embodiment of the present invention.

As shown in FIG. 1, an electric generating system 1 using a solar cell includes a solar cell 100 (100a to 100n), a power converter 200 (200a to 200n) that converts power generated in the solar cell 100 and applies the converted power to a power system 300 (Grid), and the power system 300 (Grid).

Here, the solar cell 100 is divided into a time during which sunlight exists such as daytime, and the like, and a time during which sunlight does not exist such as nighttime, and the like, generates effective power by solar power generation when the solar power generation is performed during the time which sunlight exists, and does not generate effective power when solar power generation is not performed.

As described above, since solar power generation is not constantly performed in accordance with presence and absence of sunlight, the solar cell 100 is controlled to generate the maximum amount of power through Maximum Power Point Tracking (MPPT), which tracks a maximum power point from power generated by the solar cell 100.

Figure 2:
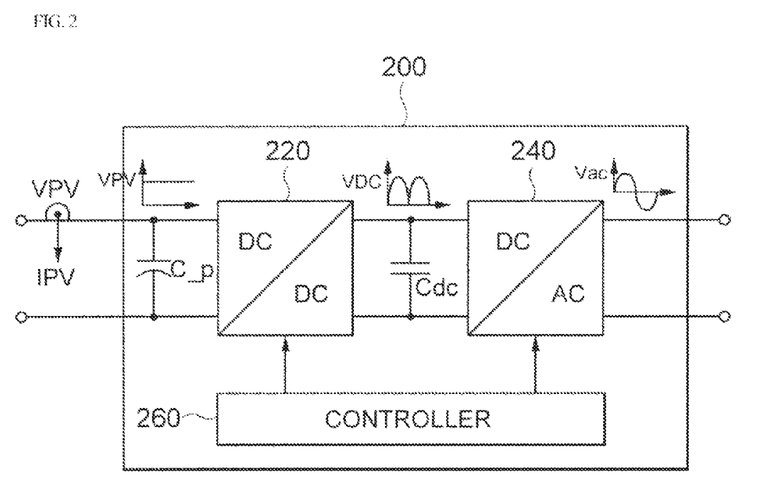
FIG. 2 is a configuration diagram of a power converter shown in FIG. 1.

FIG. 2 is a configuration diagram of a power converter shown in FIG. 1.

As shown in FIG. 2, the power converter 200 includes a Direct Current (DC)/DC converter 220 (hereinafter, referred to as converter) that converts an output voltage (VPV) generated in the solar cell 100 into a pulsed DC voltage (VDC), a DC/Alternating Current (AC) inverter 240 (hereinafter, referred to as inverter) that converts the pulsed DC voltage (VDC) into an AC voltage (Vac) and applies the converted voltage to the power system 300, and a controller 260 that controls operations of the converter 220 and the inverter 240 based on the output voltage (VPV) of the solar cell 100, an output current (IPV) of the solar cell 100, and a voltage (Vgrid) of the power system 300.

The converter 220 is an element that converts the output voltage (VPV) generated in the solar cell 100 into the DC voltage (VDC) of a sine wave type which is full wave rectified, and the output voltage (VPV) has the double frequency of the power system 300.

As the converter 220, a flyback converter, a buck-boost converter, a push-pull converter, a half-bridge converter, a full-bridge converter, and the like may be used, and a converter of a modified type base on the converter also may be used.

Figure 3:
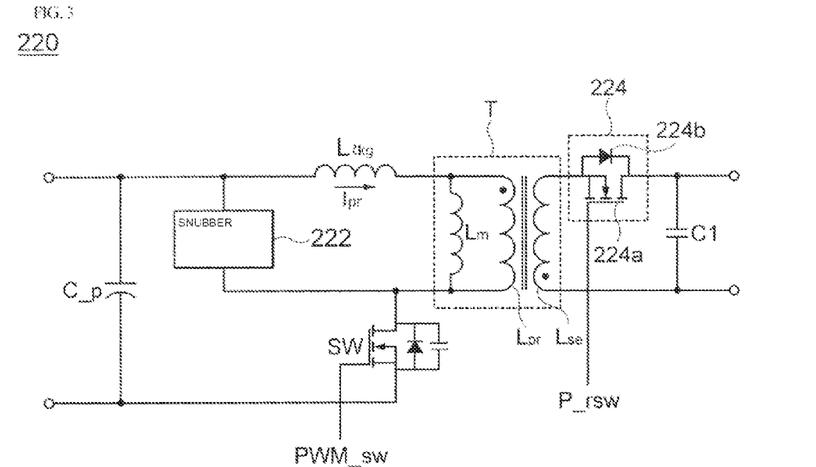
FIG. 3 is a configuration diagram of a converter shown in FIG. 2.

FIG. 3 is a configuration diagram of a converter shown in FIG. 2. In FIG. 3, according to an embodiment of the present invention, the flyback converter will be described as an example.

The flyback converter 220 shown in FIG. 3 includes a converter switching element (SW), a transformer (T), a snubber 222, a synchronous rectifier 224, and an output capacitor (C1).

The converter switching element (SW) is an element that is subjected to a Pulse Width Modulation (PWM) operation in accordance with a converter control signal (PWM_sw) output from the controller 260, and supplies a primary voltage, that is, an input voltage to the transformer (T). The converter switching element (SW) includes an MOS field-effect transistor (MOSFET).

The transformer (T) is an element that converts a primary voltage into a secondary voltage in accordance with a winding ratio of a primary coil (Lpr) and a secondary coil (Lse). The transformer (T) includes a magnetization inductor (Lm) which is equivalently connected in parallel with the primary coil (Lpr) and indicates magnetization of a magnetic core, and a leakage inductor (Llkg) that is located on a primary current (Ipr) path by leakage of a magnetic flux of the transformer (T).

As described above, the transformer (T) is configured such that a voltage charged in a power source capacitor (C_p) is induced from the primary coil to the secondary coil in accordance with a PWM control operation of the converter control signal (PWM_sw).

The snubber 222 clamps a voltage (that is, a voltage (Vds) between a drain and a source of the converter switching element (SW)) that is applied to both ends of the converter switching element (SW).

The synchronous rectifier 224 is an element that rectifies the voltage induced to the secondary coil of the transformer (T), and includes a synchronous switch 224a, and a synchronous diode 224b connected in parallel with a synchronous switch 224a in a reverse direction.

The synchronous switch 224a and the synchronous diode 224b of the synchronous rectifier 224 are configured such that one of the synchronous switch 224a and the synchronous diode 224b is selectively operated in accordance with a voltage or a phase of the power system 300, and a voltage rectified in the synchronous rectifier 224 is output as the DC voltage (VDC) via output capacity (C1).

Figure 4:
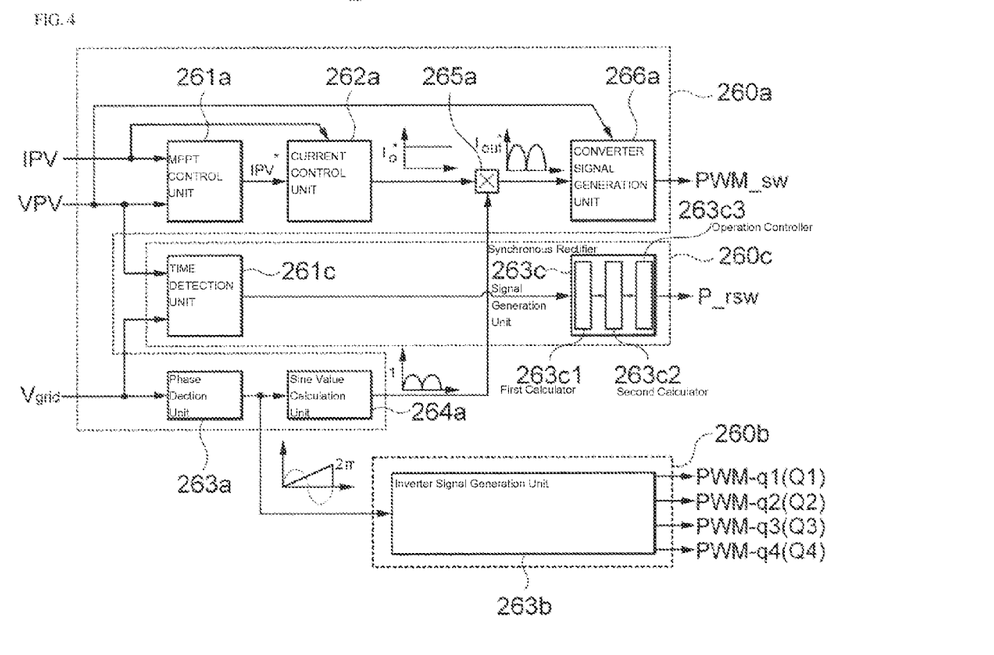
FIG. 4 is a configuration diagram of a controller shown in FIG. 2.

FIG. 4 is a configuration diagram of a controller shown in FIG. 2. As shown in FIG. 4, the controller 260 briefly includes a converter control unit 260a that generates and outputs the converter control signal (PWM_sw) to the converter 220 to convert the output voltage (VPV) generated in the solar cell 100 into the DC voltage (VDC) of the same phase, an inverter control unit 260b that generates and outputs inverter control signals (PWM_q1 to PWM_q4) to the inverter 240 to convert the DC voltage (VDC) output in the converter 220 into the AC voltage (Vac), and a synchronous rectifier control unit 260c that generates a synchronous rectifier control signal (P_rsw) and outputs the generated control signal to the synchronous switch 224a to selectively operate one of the synchronous switch 224a and the synchronous diode 224b of the synchronous rectifier 224.

The converter control unit 260a includes an MPPT control unit 261a, a current control unit 262a, a phase detection unit 263a, a sine value calculation unit 264a, an operation unit 265a, and a converter signal generation unit 266a.

The MPPT control unit 261a performs an MPPT control based on information concerning the output voltage (VPV) and the output current (IPV) of the solar cell 100 so as to maintain power conversion and a maximum output of the inverter 240 to thereby generate a reference current (IPV*), and transmits the generated reference current to the current control unit 262a.

The current control unit 262a calculates and outputs a direct current command value (Io*) in accordance with a difference value between the output current (IPV) and the reference current (IPV*) of the solar cell 100.

The phase detection unit 263a detects the phase of the power system 300. The sine value calculation unit 264a amplifies, by a gain determined in advance, a difference between a constant reference frequency determined in advance and an output frequency of the inverter 240 to thereby calculate a frequency difference amplification value, and adds the calculated frequency difference amplification value and the phase of the power system 300 detected in the phase detection unit 263a to thereby output a sine value.

The operation unit 265a includes a multiplier 265a1, and multiplies the sine value output in the sine value calculation unit 264a and the direct current command value (Io*) output by the current control unit 262a to thereby output a current command value (Iout*).

The converter signal generation unit 266a generates and outputs the converter control signal (P_sw) using the output current command value (Iout*).

An inverter signal generation unit 263b generates and outputs first to fourth inverter control signals (PWM_q1 to PWM_q4) to control first to fourth inverter switching devices (Q1 to Q4).

The synchronous rectifier control unit 260c is an element that detects the phase or the voltage of the power system 300, and selectively connects the synchronous switch 224a of the synchronous rectifier 224 in accordance with the phase or the voltage of the power system 300. More specifically, the synchronous rectifier control unit 260c calculates a loss when each of the synchronous switch 224a and the synchronous diode 224b of the synchronous rectifier 224 is operated, and controls the synchronous switch 224a or the synchronous diode 224b having a smaller loss in the phase or the voltage of the corresponding power system 300 to be selectively operated.

The synchronous rectifier control unit 260c includes a time detection unit 261c and a synchronous rectifier signal generation unit 263c.

Among others, the time detection unit 261c detects a conduction time of the synchronous rectifier 224, that is, a time during which a current is conducted through the synchronous rectifier 224.

More specifically, since the synchronous rectifier 224 is conducted such that a voltage is induced to the secondary coil of the transformer (T) when the converter switching element (SW) is opened (turn-off), the time detection unit 261c detects the conduction time of the synchronous rectifier 224 using a turn-on or turn-off time of the converter switching element (SW).

The synchronous rectifier signal generation unit 263c is an element that outputs a synchronous rectifier control signal to selectively connect the synchronous switch 224a during the conduction time of the synchronous rectifier 224, and includes a first calculator 263c1, a second calculator 263c2, and an operation controller 263c3.

The first calculator 263c1 connects the synchronous switch 224a, and calculates a loss (a loss when the synchronous switch 224a is connected) when a current flows through the synchronous switch 224a. That is, the first calculator 263c1 calculates the loss when the synchronous switch 224a is connected using a maximum current value of the synchronous switch 224a and an RMS current value of the synchronous switch 224a.

Here, the RMS current value of the synchronous switch 224a is an RMS current value of discontinuous triangular wave current that flows on the synchronous switch 224a during a single period. In this instance, the RMS current value of the synchronous switch 224a is changed depending on the phase or the voltage of the power system 300.

More specifically, in a process of calculating the loss when the synchronous switch 224a is connected in the first calculator 263c1, the first calculator 263c1 calculates the maximum current value of the synchronous switch 224a using the following Equation 1.

$$i_{s,peak} = \frac{V_{Lm}}{n \cdot L_m} D_{sp,turn-on} \qquad \text{[Equation 1]}$$

Here, Lm denotes an inductance of the magnetization inductor, $V_{Lm}$ denotes a voltage applied to the magnetization inductor, n denotes a winding ratio of the transformer, and $D_{sp,turn-on}$ denotes a duty ratio of the converter switching element.

In addition, the first calculator 263c1 calculates the RMS current value of the synchronous switch 224a using the following Equation 2.

$$i_{s,rms} = i_{s,peak} \cdot \sqrt{\frac{D_{s,turn-on} + \frac{t_{ri}}{T_{s_p}}}{3}} \qquad \text{[Equation 2]}$$

Here, $T_{sp}$ denotes a period of the converter switching element, $t_{ri}$ denotes a time during which a current rises at the time of connection of the synchronous switch and Ds, turn-on denotes a duty ratio of a synchronous rectifier.

In this instance, a time during which the current rises at the time of the connection of the synchronous switch 224a is calculated using the following Equation 3.

$$t_{ri} = \frac{Q_{gs}}{\frac{V_{CC} - V_{Flat}}{R_{gate}}} - \frac{Q_{g(th)}}{\frac{V_{CC} - V_{GS(th)}}{R_{gate}}} \qquad \text{[Equation 3]}$$

Here, $Q_{gs}$ denotes a charge between a gate and source of the synchronous switch, $Q_{g(th)}$ denotes a charge up to a threshold voltage, $V_{cc}$ denotes a voltage applied to a gate drive of the synchronous switch, $V_{flat}$ denotes a flat voltage of the gate drive of the synchronous switch, $V_{GS(th)}$ denotes a gate threshold voltage of the synchronous switch, and $R_{gate}$ denotes a gate resistance of the synchronous switch.

Next, the first calculator 263c1 calculates the loss when the synchronous switch 224a is connected using the following Equation 4 based on the calculated Equation 1 and Equation 2.

$$P_s = P_c + P_{sw} = R_{DS(on)} \cdot i_{s,rms}^2 + \tfrac{1}{2} v_{s,peak} \cdot i_{s,peak} \cdot (t_{ri} + t_r) f_{sp}$$  [Equation 4]

Here, $R_{DS(on)}$ denotes an internal resistance of the synchronous switch, $f_{sp}$ denotes a switching frequency, and $t_r$ denotes a rise time.

Meanwhile, the second calculator 263c2 calculates a loss when the synchronous diode 224b is conducted, and more specifically, calculates the loss when the synchronous diode 224b is conducted using an average current value of flowing through the synchronous diode 224b and the RMS current value of the synchronous diode 224b.

Here, the RMS current value of the synchronous diode 224b is an RMS current value of a discontinuous triangular wave current that flows on the synchronous diode 224b during a single period. In this instance, the RMS current value of the synchronous diode 224b is changed depending on the phase or voltage of the power system 300.

More specifically, the second calculator 263c2 calculates an average current value flowing through the synchronous diode 224b using the following Equation 5.

$$\langle i_{diode} \rangle = \frac{1}{2} \cdot i_{diode,peak} \cdot D_{diode,turn-on} + \frac{1}{2} \cdot i_{diode,peak} \cdot \frac{t_{ri}}{T_{sp}}$$  [Equation 5]

Here, $i_{diode,peak}$ denotes a maximum current value of the synchronous diode, $D_{diode,turn-on}$ denotes a duty ratio of the synchronous diode, $T_{sp}$ denotes a period of the converter switching element, and $t_{ri}$ denotes a time during which a current rises at the time of connection of the synchronous switch.

In addition, the second calculator 263c2 calculates the RMS current value of the synchronous diode 224b using the following Equation 6.

$$i_{diode,rms} = i_{diode,peak} \cdot \sqrt{\frac{D_{diode,turn-on} + \frac{t_{ri}}{T_{sp}}}{3}}$$  [Equation 6]

Here, $i_{diode,peak}$ denotes the maximum current value of the synchronous diode, $D_{diode,turn-on}$ denotes the duty ratio of the synchronous diode, $T_{sp}$ denotes the period of the converter switching element, and $t_{ri}$ denotes the time during which the current rises at the time of turn-on operation of the synchronous switch.

Next, the second calculator 263c2 calculates the loss when the synchronous diode 224b is conducted using the following Equation 7 based on the calculated Equation 5 and Equation 6.

$$P_d = P_c = V_{FO} \cdot \langle i_{diode} \rangle + R_{d(on)} \cdot i_{diode,rms}^2$$  [Equation 7]

Here, $R_{d(on)}$ denotes an internal resistance of the synchronous diode, and $V_{FO}$ denotes a forward voltage drop of the synchronous diode.

The operation controller 263c3 compares the loss when the synchronous switch 224a corresponding to the phase or voltage of the power system 300 during the conduction time of the synchronous rectifier 224 and the loss when the synchronous diode 224b is conducted, and outputs the synchronous rectifier control signal (P_rsw) for controlling an operation of the synchronous switch 224a based on the compared result.

That is, the operation controller 263c3 respectively calculates the loss when the synchronous switch 224a corresponding to the phase or voltage of the power system 300 during the conduction time of the synchronous rectifier 224 and the loss when the synchronous diode 224b is conducted. Here, in a case in which the loss when the synchronous switch 224a is connected is smaller than the loss when the synchronous diode 224b is conducted, the operation controller 264c3 outputs a synchronous rectifier control signal (P_rsw) for enabling the synchronous switch 224a to be connected, and in a case in which the loss when the synchronous switch 224a is connected is larger than the loss when the synchronous diode 224b is conducted, the operation controller 264c3 outputs a synchronous rectifier control signal (P_rsw) for enabling the synchronous switch 224a to be opened to thereby conduct the synchronous diode 224b.

Figure 5:
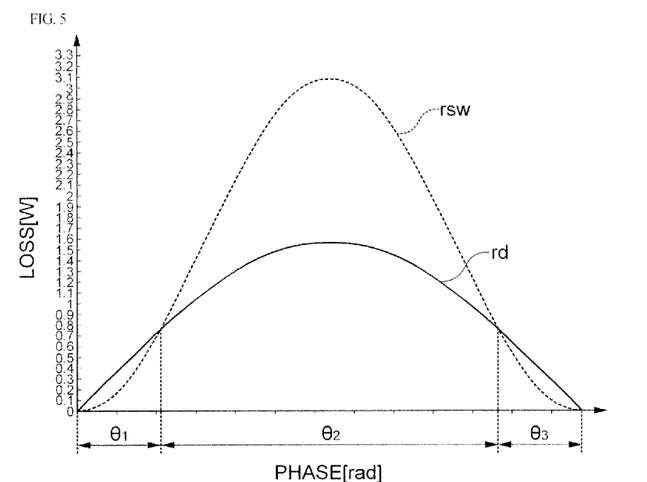
FIG. 5 is a graph showing a loss of a synchronous rectifier in accordance with a phase of a power system.
Figure 6:
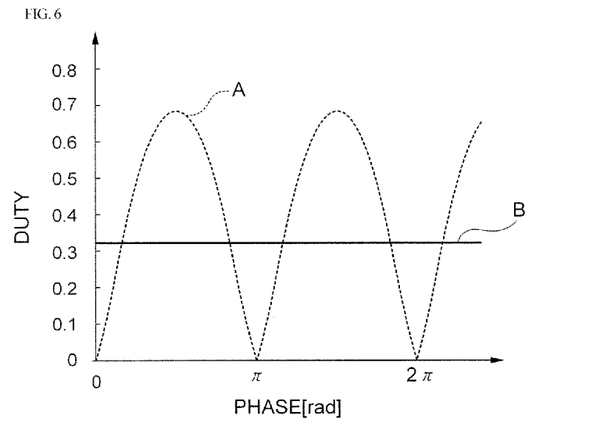
FIG. 6 is a graph showing a duty ratio of a converter switching element and a synchronous rectifier in accordance with a phase of a power system.
Figure 7A:
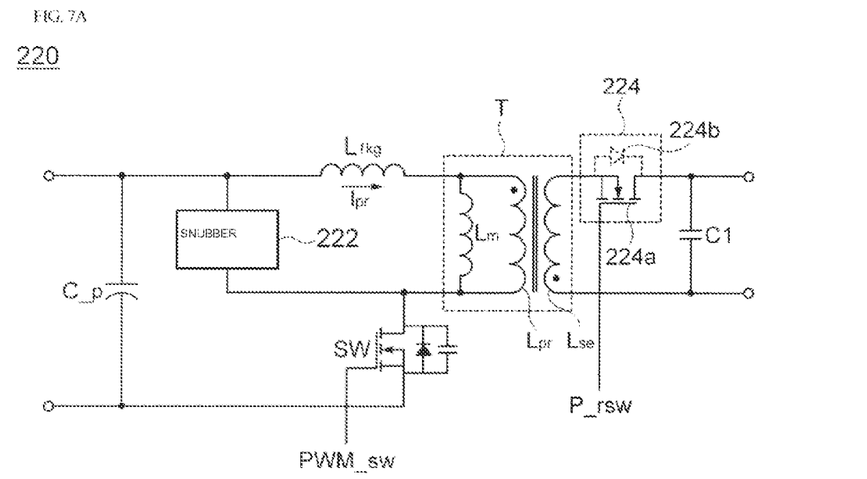
FIGS. 7A and 7B are diagrams explaining a selective operation of a synchronous rectifier in a Direct Current (DC)/DC converter according to an exemplary embodiment of the present invention.
Figure 7B:
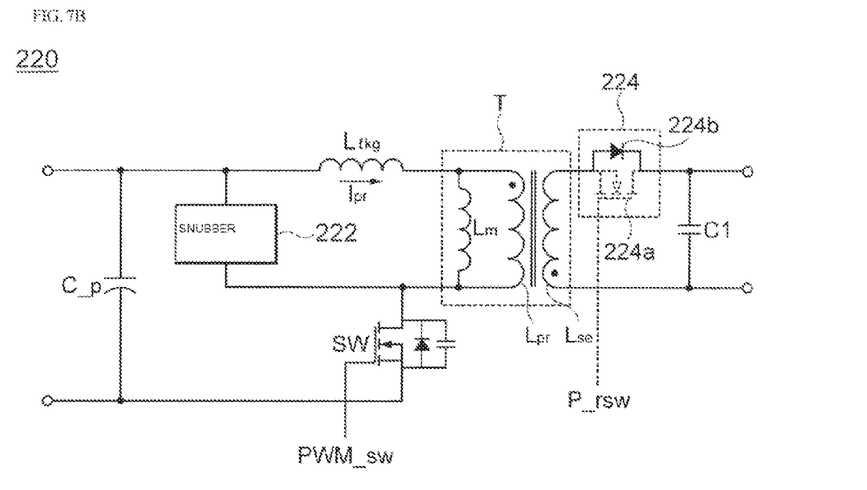

FIG. 5 is a graph showing a loss of the synchronous rectifier in accordance with the phase of the power system, FIG. 6 is a graph showing a duty ratio of the converter switching element and the synchronous rectifier in accordance with the phase of the power system, and FIGS. 7A and 7B are diagrams explaining a selective operation of the synchronous rectifier in the DC/DC converter according to an exemplary embodiment of the present invention. In the present embodiment, a control process of the synchronous rectifier in accordance with the phase of the power system will be described in detail.

First, in FIG. 5, rsw is a waveform corresponding to the loss when the synchronous switch 224a is connected, and rd is a waveform corresponding to the loss when the synchronous diode 224b is conducted. Here, since the loss when synchronous switch 224a is connected is smaller than the loss when the synchronous diode 224b is conducted in a case in which the phase of the power system 300 is included in reference phase intervals (θ1 and θ3), the synchronous rectifier control unit 260c outputs, to the synchronous switch 224a, the synchronous rectifier control signal (P_rsw) for enabling the synchronous switch 224a to be connected, so that the synchronous switch 224a is connected as shown in FIG. 7A.

However, since a loss when the synchronous diode 224b is connected is smaller than a loss when the synchronous switch 224a is conducted in a case in which the phase of the power system 300 is not included in the reference phase intervals (θ1 and θ3), that is, in a case in which the phase of the power system 300 is included in an interval (θ2), the synchronous rectifier control unit 260c outputs the synchronous rectifier control signal (P_rsw) for enabling the synchronous switch 224a to be opened to thereby open the synchronous switch 224a. Thus, as shown in FIG. 7B, the synchronous diode 224b is conducted, so that a current flows through the synchronous diode 224b.

Meanwhile, in FIG. 6, A is a duty ratio of the converter switching element (SW), and B is a duty ratio of the synchronous rectifier 224. A duty ratio of the converter switching element (SW) is converted to rectified sine wave type, a duty ratio of the synchronous rectifier 224 has fixed value.

Here, as shown in FIG. 6, the synchronous rectifier control unit 260c operates the synchronous switch 224a in an interval in which the duty ratio of the converter switching element (SW) is smaller than the duty ratio of the synchronous rectifier 224, and conducts the synchronous diode 224b in an interval in which the duty ratio of the converter switching element (SW) is larger than the duty ratio of the synchronous rectifier 224.

That is, in a scheme of controlling the synchronous rectifier 224 including the synchronous switch 224a and the synchronous diode 224b that is connected in parallel with the synchronous switch 224a, the phase or voltage of the power system 300 is detected, and whether the phase or voltage of the power system 300 is included in a reference phase interval or a reference voltage interval is determined. Here, when the phase or voltage of the power system 300 is included in the reference phase interval or the reference voltage interval, the synchronous switch 224a is controlled to be connected.

When the phase or voltage of the power system 300 is not included in the reference phase interval or the reference voltage interval, the synchronous diode 224b connected in parallel with the synchronous switch 224a is controlled to be conducted by opening the synchronous switch 224a.

Here, the reference phase interval or the reference voltage interval indicates an interval in which the loss when the synchronous switch 224a is connected is smaller than the loss when the synchronous diode is conducted.

Consequently, according to embodiments of the present invention, the losses (a conduction loss and a turn-on loss of the switch in a case of the synchronous switch 224a, and a forward voltage drop loss and a conduction loss in a case of the synchronous diode 224b) generated when a current flows through the synchronous switch 224a or the synchronous diode 224b are compared, and one of the losses is selectively controlled, so that the conduction loss is reduced.

As described above, according to a Direct Current (DC)/DC converter, and an electric generating system using a solar cell including the DC/DC converter of an embodiment, there are advantages in that a synchronous rectifier including a synchronous switch and a synchronous diode is connected to a transformer, and a conduction loss is reduced by selectively operating the synchronous switch or the synchronous diode in accordance with a phase or a voltage of a power system.

More specifically, there are advantages in that a loss when each of the synchronous switch and the synchronous diode of the synchronous rectifier are operated is calculated, and the conduction loss is reduced by controlling the synchronous switch or the synchronous diode having a smaller loss in a phase or a voltage of a corresponding power system to be selectively operated.

Thus, an effect which increases overall efficiency of the electric generating system using the solar cell is created.

While the present invention has been shown and described in connection with the embodiments, it will be apparent to those skilled in the art that modifications and variations can be made without departing from the spirit and scope of the invention as defined by the appended claims.

What is claimed is:

1. An electric generating system using a solar cell, which converts a voltage generated in the solar cell into an alternating current (AC) voltage, and applies the converted voltage to a power system, the electric generating system comprising:
   a direct current (DC)/DC converter that converts the voltage generated in the solar cell into a DC voltage, and includes a synchronous rectifier having a synchronous switch; and
   a controller that detects one of a phase and a voltage of the power system, and selectively connects a transformer of DC/DC converter with the synchronous switch of the synchronous rectifier in accordance with one of the phase and the voltage of the power system,
   wherein the synchronous rectifier further includes a synchronous diode that is connected in parallel with the synchronous switch, and
   wherein the controller calculates a loss when the synchronous switch corresponding to one of the phase and the voltage of the power system is connected and a loss when the synchronous diode is conducted, and connects the synchronous switch in a case in which the loss when the synchronous switch is connected is smaller than the loss when the synchronous diode is conducted.

2. An electric generating system using a solar cell, which converts a voltage generated in the solar cell into an alternating current (AC) voltage, and applies the converted voltage to a power system, the electric generating system comprising:
   a direct current (DC)/DC converter that converts the voltage generated in the solar cell into a DC voltage, and includes a synchronous rectifier having a synchronous switch; and
   a controller that detects one of a phase and a voltage of the power system, and selectively connects a transformer of DC/DC converter with the synchronous switch of the synchronous rectifier in accordance with one of the phase and the voltage of the power system,
   wherein the synchronous rectifier further includes a synchronous diode that is connected in parallel with the synchronous switch, and
   wherein the controller calculates a loss when the synchronous switch corresponding to one of the phase and the voltage of the power system is connected and a loss when the synchronous diode is conducted, and conducts the synchronous diode in a case in which the loss when the synchronous switch is connected is larger than the loss when the synchronous diode is conducted.

3. An electric generating system using a solar cell, which converts a voltage generated in the solar cell into an alternating current (AC) voltage, and applies the converted voltage to a power system, the electric generating system comprising:
   a direct current (DC)/DC converter that converts the voltage generated in the solar cell into a DC voltage, and includes a synchronous rectifier having a synchronous switch; and
   a controller that detects one of a phase and a voltage of the power system, and selectively connects a transformer of DC/DC converter with the synchronous switch of the synchronous rectifier in accordance with one of the phase and the voltage of the power system,
   wherein the synchronous rectifier further includes a synchronous diode that is connected in parallel with the synchronous switch, and
   wherein the controller includes:
      a time detection unit that detects a conduction time of the synchronous rectifier, the conduction time being a time during which a current is conducted through the synchronous rectifier, and
      a synchronous rectifier signal generation unit that outputs a synchronous rectifier control signal to selectively connect the synchronous switch during the conduction time of the synchronous rectifier, and
   wherein the synchronous rectifier signal generation unit includes:
      a first calculator that calculates a loss when the synchronous switch is connected,
      a second calculator that calculates a loss when the synchronous diode is conducted, and
      an operation controller that compares a loss when the synchronous switch corresponding to one of the phase and the voltage of the power system is connected and a loss when the synchronous diode is conducted during the conduction time of the synchronous rectifier, and outputs a synchronous rectifier control signal for controlling an operation of the synchronous switch based on a compared result.

4. The electric generating system according to claim 3, wherein the first calculator calculates the loss when the synchronous switch is connected, using a maximum current value of the synchronous switch and an RMS current value of the synchronous switch.

5. The electric generating system according to claim 4, wherein the first calculator calculates the maximum current value of the synchronous switch using the following Equation 1

$$i_{s,peak} = \frac{V_{Lm}}{n \cdot L_m} D_{sp,turn-on}, \quad \text{[Equation 1]}$$

where Lm denotes an inductance of a magnetization inductor, $V_{Lm}$ denotes a voltage applied to the magnetization inductor, n denotes a winding ratio of a transformer, and $D_{sp,turn-on}$ denotes a duty ratio of a converter switching element.

6. The electric generating system according to claim 5, wherein the first calculator calculates the RMS current value of the synchronous switch using the following Equation 2

$$i_{s,rms} = i_{s,peak} \cdot \sqrt{\frac{D_{s,turn-on} + \frac{t_{ri}}{T_{sp}}}{3}}, \quad \text{[Equation 2]}$$

where $T_{sp}$ denotes a period of the converter switching element, $t_{ri}$ denotes a time during which a current increases at the time of connection of the synchronous switch and Ds, turn-on denotes a duty ratio of a synchronous rectifier.

7. The electric generating system according to claim 6, wherein the first calculator calculates the time during which the current rises at the time of connection of the synchronous switch using the following Equation 3

$$t_{ri} = \frac{Q_{gs}}{\frac{V_{CC} - V_{Flat}}{R_{gate}}} - \frac{Q_{g(th)}}{\frac{V_{CC} - V_{GS(th)}}{R_{gate}}}, \quad \text{[Equation 3]}$$

where $Q_{gs}$ denotes a charge between a gate and source of the synchronous switch, $Q_{g(th)}$ denotes a charge up to a threshold voltage, $V_{cc}$ denotes a voltage applied to a gate drive of the synchronous switch, $V_{flat}$ denotes a flat voltage of the gate drive of the synchronous switch, $V_{GS(th)}$ denotes a gate threshold voltage of the synchronous switch, and $R_{gate}$ denotes a gate resistance of the synchronous switch.

8. The electric generating system according to claim 7, wherein the first calculator calculates the loss when the synchronous switch is connected using the following Equation 4

$$P_s = P_c + P_{sw} = R_{DS(on)} \cdot i_{s,rms}^2 + \frac{1}{2} v_{s,peak} \cdot i_{s,peak} \cdot (t_{ri} + t_r) f_{s_r}, \quad \text{[Equation 4]}$$

where $R_{DS(on)}$ denotes an internal resistance of the synchronous switch, $f_{sp}$ denotes a switching frequency, and $t_r$ denotes a rise time.

9. The electric generating system according to claim 3, wherein the second calculator calculates the loss when the synchronous diode is conducted using an average current value flowing through the synchronous diode and an RMS current value of the synchronous diode.

10. The electric generating system according to claim 9, wherein the second calculator calculates the average current value flowing through the synchronous diode using the following Equation 5

$$\langle i_{diode} \rangle = \frac{1}{2} \cdot i_{diode,peak} \cdot D_{diode,turn-on} + \frac{1}{2} \cdot i_{diode,peak} \cdot \frac{t_{ri}}{T_{sp}}, \quad \text{[Equation 5]}$$

where $i_{diode,peak}$ denotes a maximum current value of the synchronous diode, $D_{diode,turn-on}$ denotes a duty ratio of the synchronous diode, $T_{sp}$ denotes a period of a converter switching element, and $t_{ri}$ denotes a time during which a current rises at the time of connection of the synchronous switch.

11. The electric generating system according to claim 10, wherein the second calculator calculates the RMS current value of the synchronous diode using the following Equation 6

$$i_{diode,rms} = i_{diode,peak} \cdot \sqrt{\frac{D_{diode,turn-on} + \frac{t_{ri}}{T_{sp}}}{3}}, \quad \text{[Equation 6]}$$

where $i_{diode,peak}$ denotes the maximum current value of the synchronous diode, $D_{diode,turn-on}$ denotes the duty ratio of the synchronous diode, $T_{sp}$ denotes the period of the converter switching element, and $t_{ri}$ denotes a time during which a current increases at the time of connection of the synchronous switch.

12. The electric generating system according to claim 11, wherein the second calculator calculates the loss when the synchronous diode is conducted using the following Equation 7

$$P_d = P_c = V_{FO} \cdot \langle i_{diode} \rangle + R_{d(on)} i_{diode,rms}^2, \quad \text{[Equation 7]}$$

where $R_{d(on)}$ denotes an internal resistance of the synchronous diode, and $V_{FO}$ denotes a forward voltage drop of the synchronous diode.

13. A DC/DC converter that converts a voltage generated in a solar cell into a DC voltage, comprising:
a transformer that has a secondary coil for inducing energy from a primary coil for receiving a primary current;
a synchronous rectifier that includes a synchronous switch connected with the secondary coil of the transformer, and a synchronous diode connected in parallel with the synchronous switch; and
a synchronous rectifier control unit that detects one of a phase and a voltage of the power system, and selectively connects the transformer with the synchronous switch in accordance with one of the phase and the voltage of the power system, wherein the synchronous rectifier control unit calculates a loss when the synchronous switch corresponding to one of the phase and the voltage of the power system is connected and a loss when the synchronous diode is conducted, and connects the synchronous switch in a case in which the loss when the synchronous switch is connected is smaller than the loss when the synchronous diode is conducted.

14. A DC/DC converter that converts a voltage generated in a solar cell into a DC voltage, comprising:
- a transformer that has a secondary coil for inducing energy from a primary coil for receiving a primary current;
- a synchronous rectifier that includes a synchronous switch connected with the secondary coil of the transformer, and a synchronous diode connected in parallel with the synchronous switch; and
- a synchronous rectifier control unit that detects one of a phase and a voltage of the power system, and selectively connects the transformer with the synchronous switch in accordance with one of the phase and the voltage of the power system,
wherein the synchronous rectifier control unit calculates a loss when the synchronous switch corresponding to one of the phase and the voltage of the power system is connected and a loss when the synchronous diode is conducted, and conducts the synchronous diode in a case in which the loss when the synchronous switch is connected is larger than the loss when the synchronous diode is conducted.

* * * * *